United States Patent [19]

White et al.

[11] Patent Number: 5,525,103

[45] Date of Patent: Jun. 11, 1996

[54] PROCESS FOR PREPARING PORK BACK RIB CUTS

[76] Inventors: John A. White, 1897 Wachtler, Mendota Heights, Minn. 55118; Omal C. Maitra, 2644 Humboldt Ave. South, Minneapolis, Minn. 55408

[21] Appl. No.: 380,065

[22] Filed: Jan. 30, 1995

[51] Int. Cl.⁶ .................................. A22C 17/00
[52] U.S. Cl. .......................... 452/149; 452/135
[58] Field of Search .................. 452/135, 171, 452/149

[56] References Cited

U.S. PATENT DOCUMENTS

| | | | |
|---|---|---|---|
| D. 293,041 | 12/1987 | Gagliardi, Jr. | 452/149 |
| 4,128,916 | 12/1978 | Fick et al. | 452/171 |
| 4,134,181 | 1/1979 | Schneider et al. | 452/171 |
| 4,628,569 | 12/1986 | Gagliardi, Jr. | 452/149 |
| 5,088,957 | 2/1992 | Gagliardi, Jr. | 452/149 |
| 5,192,242 | 3/1993 | Sandos et al. | 452/136 |
| 5,195,924 | 3/1993 | Gagliardi, Jr. | 452/149 |
| 5,226,850 | 7/1993 | Klaasen | 452/135 |
| 5,250,309 | 10/1993 | Gagliardi, Jr. | 452/149 |
| 5,266,064 | 11/1993 | Gagliardi, Jr. | 452/149 |
| 5,286,229 | 2/1994 | Gagliardi, Jr. | 452/149 |

*Primary Examiner*—Willis Little
*Attorney, Agent, or Firm*—Kinney & Lange

[57] ABSTRACT

The present invention is a process or method for cutting and boning a pork loin which includes back ribs and a semispinalis muscle adjacent the back ribs. The method involves separating the semispinalis muscle into a first portion and a second portion. The first portion remains adjacent the back ribs and the second portion is boneless. The resulting back rib cut contains a larger percentage of meat and is easier to consume.

12 Claims, 3 Drawing Sheets

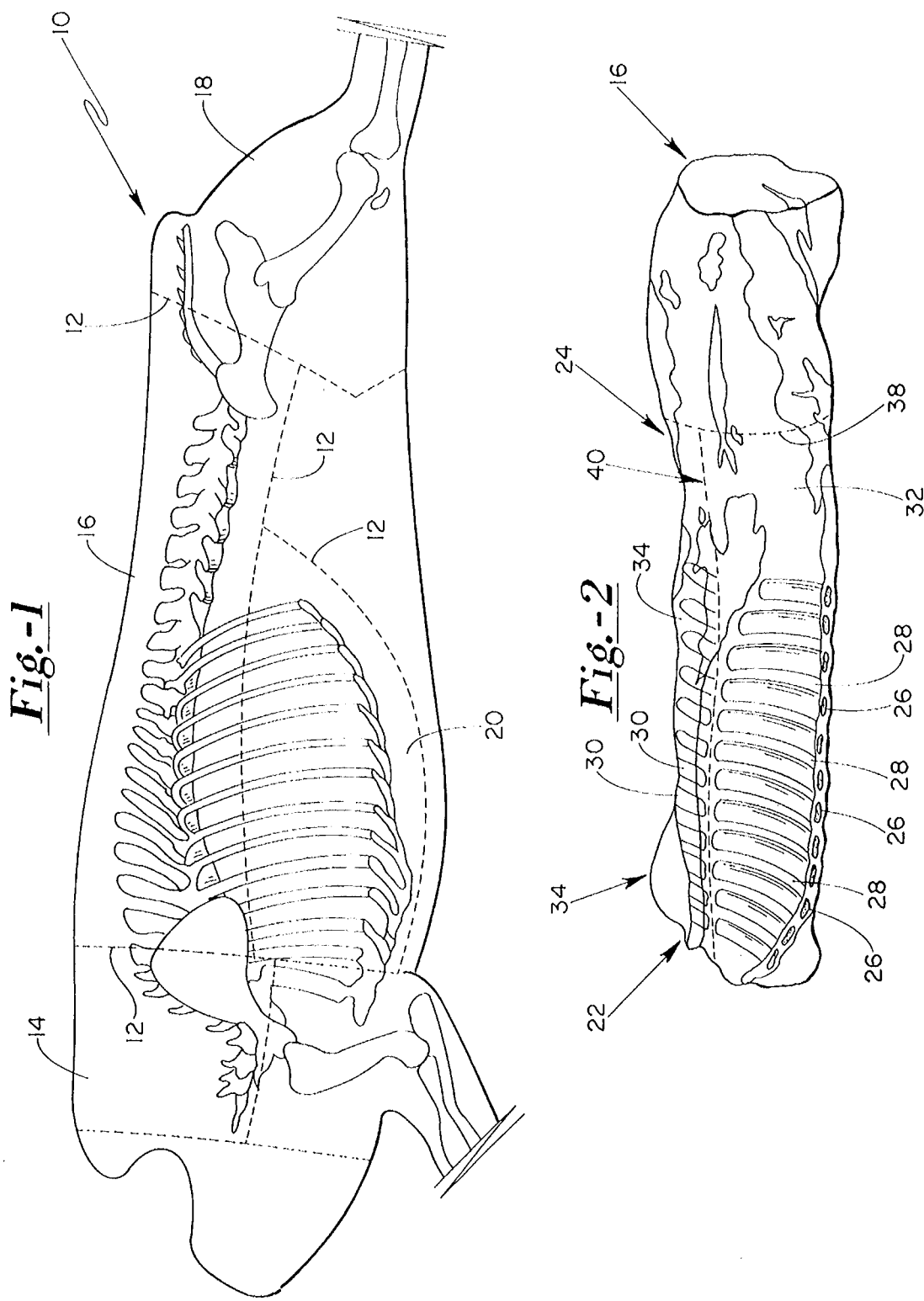

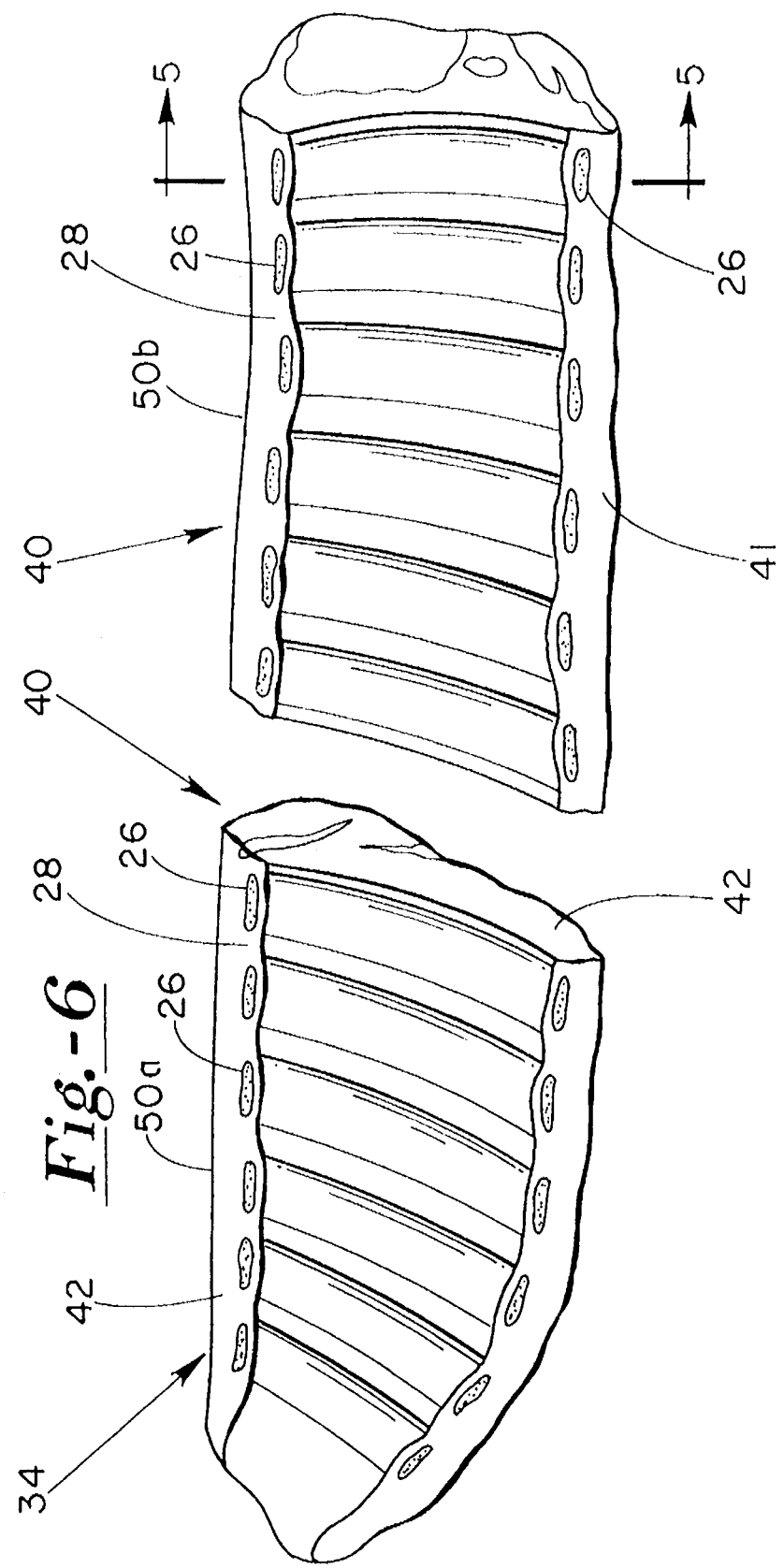

PROCESS FOR PREPARING PORK BACK RIB CUTS

BACKGROUND OF THE INVENTION

The present invention relates to a process for preparing a meat product from an animal carcass. In particular, the present invention relates to a method for cutting and boning a pork loin to produce pork loin cuts.

Pork carcasses are typically butchered into several main cuts or sections including the loin, shoulder, ham and belly sections. A loin section is that portion of a side of pork remaining after the shoulder, ham, belly and fatback have been removed. The loin section may also include the blade bone with its overlying flesh. Several individual cuts or portions may be taken from the loin section of the hog including bladeless loin, center cut loin, boneless loin, Canadian back, back ribs and country style ribs. The bladeless loin is the remaining portion of the loin section after the blade bone and related cartilage and overlying flesh have been removed. The center cut loin is prepared by removing the shoulder end and the ham end of the loin section to leave not more than eight ribs. Chops are typically prepared from the bladeless loin and the center cut loin by making cuts generally perpendicular to the longitudinal length of the loin.

Alternatively, the loin section may be used to prepare boneless loin, Canadian back, tenderloin, back ribs and country style ribs by cutting the loin section longitudinally from the shoulder end of the loin towards the ham end of the loin. The tenderloin is generally prepared by cutting the loin section longitudinally to remove the meat lying ventral to the back ribs towards the ham end of the loin. The remaining loin section includes the back ribs and the semispinalis muscle. The semispinalis muscle is generally the meaty tissue above the back ribs opposite the tenderloin. Boneless loin cuts and the back rib cuts are generally prepared by cutting or deboning the remaining loin sections between the semispinalis muscle and the back ribs, adjacent to the back ribs, to form the boneless loin cut and the back ribs cut. The boneless loin cut is identified by International Meat Purchaser Specification (IMPS) No. 413 while the back rib cut is identified by IMPS No. 422. As conventionally known, the boneless loin cut generally includes the entire semispinalis muscle separated from the back ribs. The boneless loin cut is typically further processed to provide Canadian bacon, boneless pork loin roast, boneless rolled and tied roasts or butterfly pork chops.

As conventionally known, the back rib cut consists of rib bones and related intercostal meat. Each back rib section is intact and includes portions of at least ten ribs. Back rib cuts are generally sold as a single intact rib section which may be prepared and consumed with various sauces. Although the back rib cut is merely a by-product from deboning the loin section, the demand for the back rib cuts has increased dramatically in recent years due to the increase in demand for "finger food", such as buffalo wings. However, because back rib cuts typically contain only intercostal meat between the rib bones, conventional back rib cuts do not include a substantial amount of meat. In addition, the intercostal meat is not easily accessible and is generally more difficult to consume. Consequently, conventional back rib cuts are difficult to consume and do not provide a substantial amount of meat or servings to meet the increased demand for the back rib cuts.

SUMMARY OF THE INVENTION

The present invention is an improved process or method for cutting and boning a pork loin which includes back ribs and a semispinalis muscle adjacent the back ribs. The method involves separating the semispinalis muscle into a first back rib portion and a second boneless portion. The first back rib portion remains adjacent the back ribs. The resulting back rib cut contains a large percentage of meat and is easier to consume.

BRIEF DESCRIPTION OF THE DRAWINGS

FIG. 1 is a diagrammatical side view of a side of pork with cut lines added to illustrate main sections including a loin section.

FIG. 2 is a perspective view of the loin section of FIG. 1.

FIG. 6 is a perspective view of the improved back rib cut of FIG. 5 cut into two individual servings.

DETAILED DESCRIPTION OF THE PREFERRED EMBODIMENTS

Figure 3:
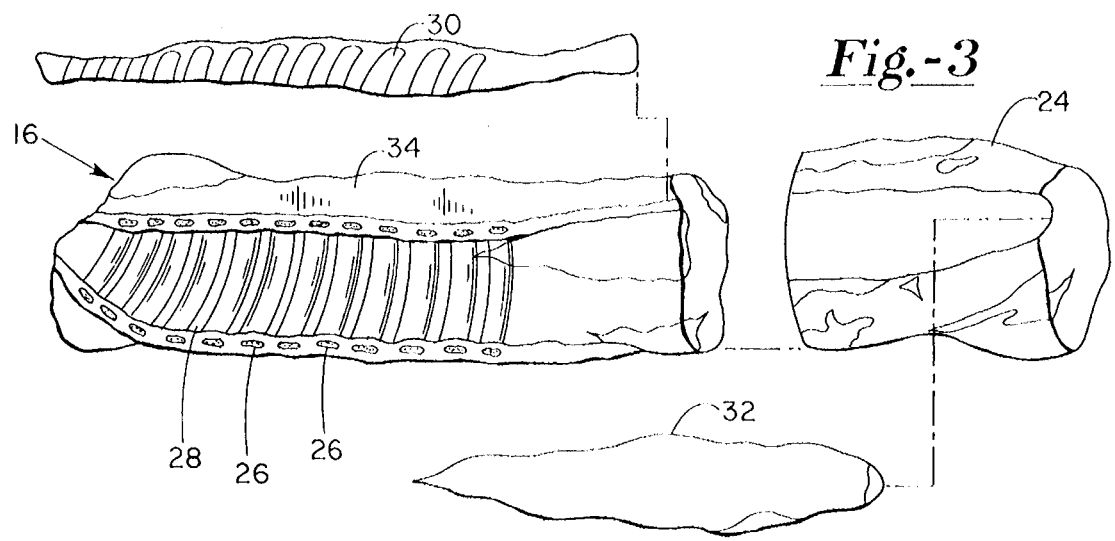
FIG. 3 is a perspective view of the loin section of FIG. 2 showing the tenderloin, sirloin end and thoracic vertebrae removed from the loin section.

FIG. 1 is a diagrammatical side sectional view of a side of pork 10 with cut lines 12 added to illustrate main sections and cuts of side 10 after butchering. Typically, side 10 is butchered about cuts lines 12 into main sections including shoulder 14, loin 16, ham 18 and belly 20. Loin section 16 is a portion of side 10 remaining after shoulder 14, ham 18, belly 20 and fat back have been removed to leave the bladebone portion with its overlying flesh and at least two sacral, but no caudal vertebrae in the loin. Loin section 16 is identified by Institutional Meat Purchaser Specification (IMPS) No. 410.

FIG. 2 is a perspective view of pork loin section 16 which includes shoulder end 22, sirloin end 24, back ribs 26, intercostal meat 28, thoracic vertebrae 30, tenderloin 32 and semispinalis muscle 34. FIG. 2 further shows cut lines 38 and 40 about which loin section 16 is cut to remove at least a portion of sirloin end 24 and thoracic vertebrae 30 from loin section 16, respectively. Shoulder end 22 is the portion of loin section 16 adjacent to shoulder 14 of side 10 (shown in FIG. 1) while sirloin end 24 is the portion of loin section 16 adjacent ham 18 of side 10 (shown in FIG. 1). Sirloin end 24 extends from ham 18 to a point near back ribs 26. Back ribs 26 extend upward and are joined to back ribs of the opposite side of the hog by thoracic vertebrae 30. Back ribs 26 carry intercostal meat 28 between the individual rib bones. Tenderloin 32 ventrally extends adjacent back ribs 26 towards sirloin end 24 of loin section 16. Semispinalis muscle 34 extends along the entire longitudinal length of loin section 16 adjacent back ribs 28 opposite the ventral side of back ribs 26.

FIG. 3 shows sirloin end 24, thoracic vertebrae 30 and tenderloin 32 removed from loin section 16. Tenderloin 32 is first removed by cutting between back ribs 26 and tenderloin 32 adjacent to back ribs 26. Sirloin end 24 of loin section 16 is next removed at the hip bone with all overlying meat. The remaining portion of loin 16 is boned or cut to remove thoracic vertebrae 30 and related bones by cutting or sawing at the junction of back ribs 26 and vertebrae 30 along the length of loin section 16. As a result, the remaining portion of loin section 16 generally includes back ribs 26, the intercostal meat 28 between back ribs 26 and the semispinalis muscle 34 which extends anti-ventrally adjacent to back ribs 26.

Figure 4:
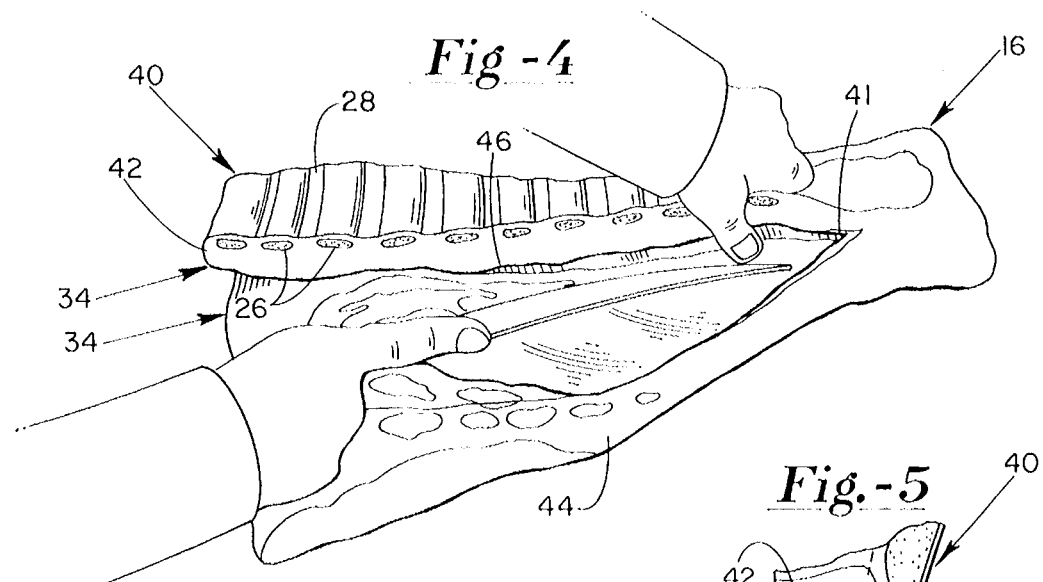
FIG. 4 is a perspective view illustrating the remaining loin section of FIG. 3 being cut according to the present invention to create an improved back rib cut and a boneless loin cut.

FIG. 4 illustrates a method for butchering or boning the remainder of loin section 16 to create an improved, more meatier and more easily consumed back rib cut 40. As shown by FIG. 4, the remainder of loin section 16 is cut along its longitudinal length in an arcuate plane generally parallel to the arcuate or curved plane containing back ribs 26. However, in contrast to conventional boning of loin section 16, the remainder of loin section 16 is not cut between back ribs 26 and the semispinalis muscle 34, adjacent to back ribs 26. Instead, the semispinalis muscle 34 is cut about cut line 41 and is separated into back rib portion 42 and boneless portion 44. Back rib portion 42 remains attached and adjacent to the back ribs 26. Because loin section 16 is preferably cut in an arcuate plane generally parallel to the arcuate plane containing back ribs 26, back rib portion 42 has a generally convex surface opposite the generally concave surface of back ribs 26. As a result, the thickness of back rib portion 42 is uniform from the top to the bottom of each rib 26 to maintain the rib appearance and quality of back rib cut 40. Alternatively, cut line 41 may be about a flat plane such that rib portion 42 has a flat outer surface opposite ribs 26. Back rib portion 42 has a thickness of at least 0.2 inches and preferably has a thickness of between about 0.5 to about 0.75 inches. Because back rib portion 42 has a thickness of at least 0.2 inches, back rib portion 42 of semispinalis muscle 34 adds a significant amount of meat to back rib cut 40, in addition to the already present intercostal meat 28. However, in contrast to the intercostal meat 28, the meat of back rib portion 42 is easily accessible and consumed. Because back rib portion 42 adds a significant amount meat to back rib cut 40, a greater number of servings can be derived from the same hog. Because back rib portion 42 preferably has a thickness of about 0.5 to about 0.75 inches, back rib portion 42 significantly increases the amount of meat contained in a single back rib cut and, at the same time, maintains the rib appearance and quality which enables back rib cut 40 to be cooked and eaten similar to conventional back rib cuts which are eaten similar to "finger food".

In the preferred embodiment, boneless portion 44 has a generally concave inner surface along the plane about which cut line 41 was made. Boneless portion 44 is much smaller than conventional boneless loins. However, boneless portion 44 may still be processed into such items as Canadian bacon, boneless pork loin roasts, boneless rolled and tied roasts or butterfly pork chops.

Figure 5:
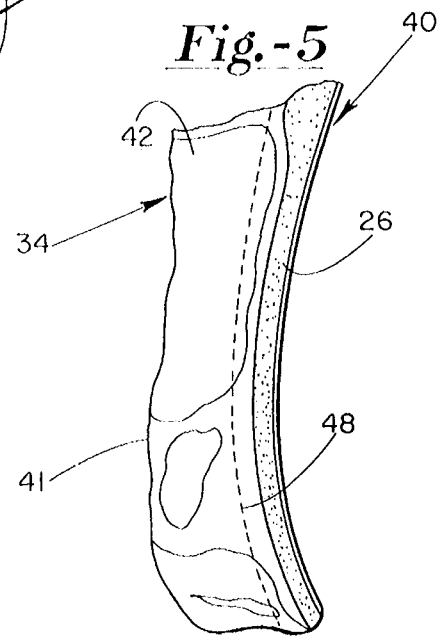
FIG. 5 is an end sectional view of the improved back rib cut of FIG. 4.

FIG. 5 is a sectional view of back rib cut 40. In addition, FIG. 5 also shows cut line 48 of the conventional method of butchering or boning loin section 16 to separate back ribs 26 and the semispinalis muscle 34 to create conventional boneless loin cuts identified by IMPS No. 413 and conventional back rib cuts identified by IMPS No. 422. As shown by FIG. 5, back rib portion 42 taken from semispinalis muscle 34 adds a significant amount of meat adjacent to back ribs 26. As a result, back rib cut 40 contains a significant amount of meat from which a greater number of servings can be derived.

FIG. 6 shows back rib cut 40 cut and separated into two individual back rib servings 50a, 50b. Preferably, back rib portion 42 is cut between the fourth and eighth ribs. Because back rib portion 42 adds a significant amount of meat to back rib cut 40, servings 50a and 50b are each large enough to provide two servings. In addition, the meat added to back rib cut 40 by back rib portion 42 of the semispinalis muscle 34 is more easily cooked and accessible as well as eaten. As a result, the improved method of deboning or butchering a pork loin to create back rib cuts better satisfies the demand for back ribs.

Although the present invention has been described with reference to preferred embodiments, workers skilled in the art will recognize that changes may be made in form and detail without departing from the spirit and scope of the invention.

What is claimed is:

1. A method for cutting and boning a pork loin which includes back ribs and a semispinalis muscle adjacent the back ribs, the method comprising:

separating the semispinalis muscle into a first portion and a second portion, wherein the first portion comprises a substantial portion of the muscle adjacent the back ribs and wherein the second portion is boneless.

2. The method of claim 1 wherein separating the semispinalis muscle includes:

cutting the semispinalis muscle so that the first portion has a thickness of at least 0.2 inches.

3. The method of claim 1 wherein separating the semispinalis muscle includes:

cutting the semispinalis muscle so that the first portion has a thickness of between about 0.5 to about 0.75 inches.

4. The method of claim 1 wherein the back ribs include at least ten ribs and wherein the method includes:

cutting the back ribs and the first portion of the semispinalis muscle between the fourth and eighth ribs.

5. A method for preparing pork back ribs from a pork loin including a semispinalis muscle adjacent the back ribs, the method comprising:

removing only a portion of the semispinalis muscle from the pork loin so as to leave a substantial portion of the muscle adjacent the back ribs.

6. A method for cutting and boning a pork loin which includes back ribs which lie in a first arcuate plane and a thickness of semispinalis muscle adjacent the back ribs, the method comprising:

cutting in a second arcuate plane parallel to and substantially spaced from the first arcuate plane through the semispinalis muscle to create a back rib cut of uniformed thickness.

7. The method of claim 6 wherein the second arcuate plane is at least about 0.2 inches above the first arcuate plane.

8. The method of claim 6 wherein the second arcuate plane is about 0.5 to about 0.75 inches above the first arcuate plane.

9. A pork loin cut comprising:

back ribs; and a substantial portion of semispinalis muscle adjacent the back ribs, wherein the portion is less than 100% of the semispinalis muscle.

10. The cut of claim 9 wherein the portion has a thickness of at least 0.2 inches.

11. The cut of claim 9 wherein the portion of semispinalis muscle has a thickness of between about 0.5 to about 0.75 inches.

12. The pork loin cut formed from the pork loin, by the method comprising:

cutting the semispinalis muscle to separate the semispinalis muscle into a first portion and a second portion, wherein the first portion comprises a substantial portion of the muscle adjacent the back ribs and wherein the second portion is boneless.

* * * * *